C. H. MATTICE.
VARIABLE SPEED COUNTER SHAFTS.
APPLICATION FILED JAN. 6, 1913.

1,121,854.

Patented Dec. 22, 1914.
2 SHEETS—SHEET 1.

Witnesses:
Minnie J. Reens
Loretta F. Brady

Charles H. Mattice
Inventor

By Geo. L. Cooper
Attorney

C. H. MATTICE.
VARIABLE SPEED COUNTER SHAFTS.
APPLICATION FILED JAN. 6, 1913.

1,121,854.

Patented Dec. 22, 1914.
2 SHEETS—SHEET 2.

Witnesses:
Minnie J. Reeves
Loretta F. Brady

Charles H. Mattice
Inventor

By J. H. Cooper
Attorney

UNITED STATES PATENT OFFICE.

CHARLES H. MATTICE, OF TROY, NEW YORK, ASSIGNOR OF ONE-HALF TO ADAMS LAUNDRY MACHINERY COMPANY, OF TROY, NEW YORK, A CORPORATION OF NEW YORK.

VARIABLE-SPEED COUNTER-SHAFTS.

1,121,854.   Specification of Letters Patent.   Patented Dec. 22, 1914.

Application filed January 6, 1913. Serial No. 740,350.

*To all whom it may concern:*

Be it known that I, CHARLES H. MATTICE, a citizen of the United States, and resident of Troy, Rensselaer county, New York, have invented certain new and useful Improvements in Variable-Speed Counter-Shafts, of which the following is a specification.

My invention relates to counter shafts such as are used to vary the rotative speed of various machines, as lathes and the like. It more particularly relates to a belt shifting means adapted to such a speed varying device. Its object is to provide means for a positive, step-by-step, transverse movement of the belt to any one of a plurality of desired positions.

Further objects of the invention will appear in this specification and will be pointed out in the claims.

Figure 1:
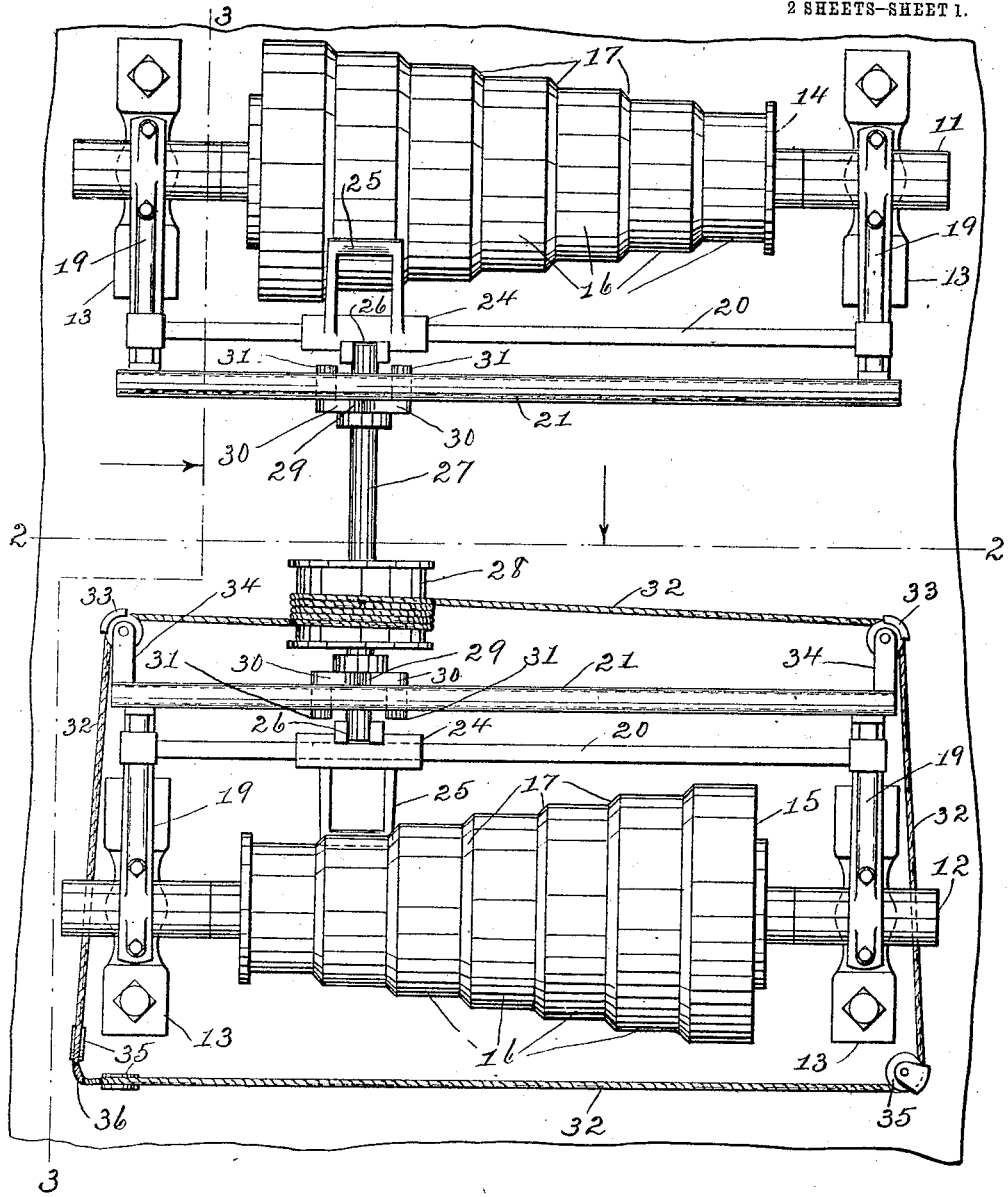
Figure 2:
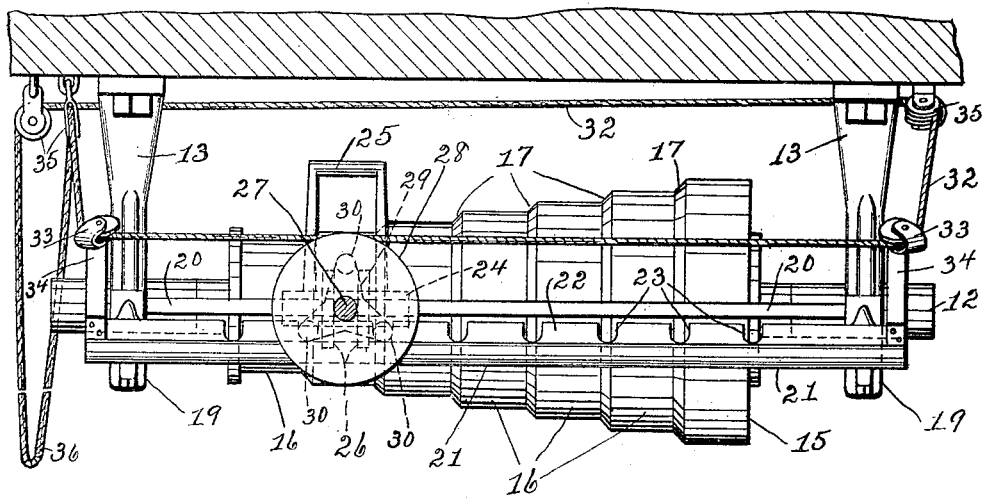
Figure 3:
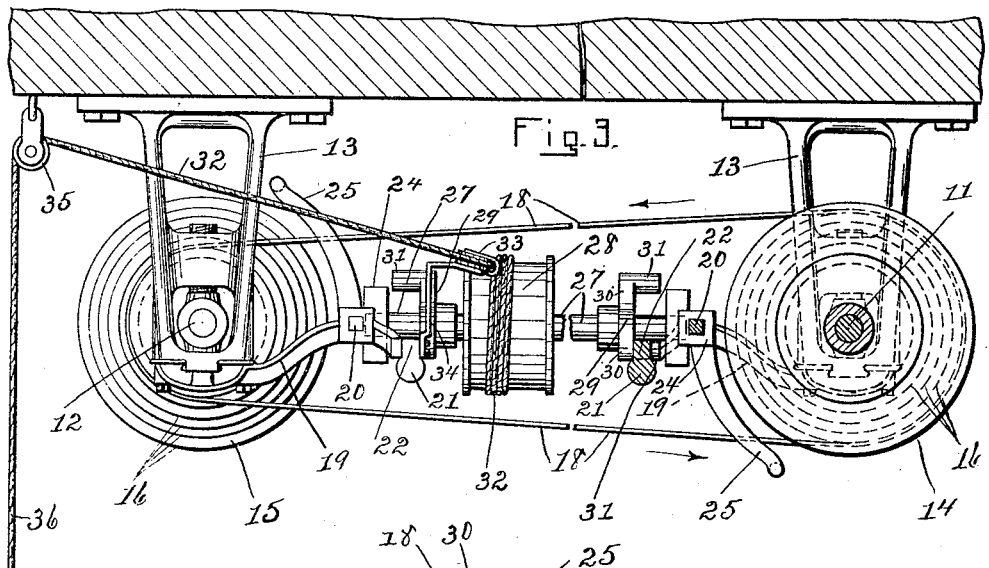
Figure 4:
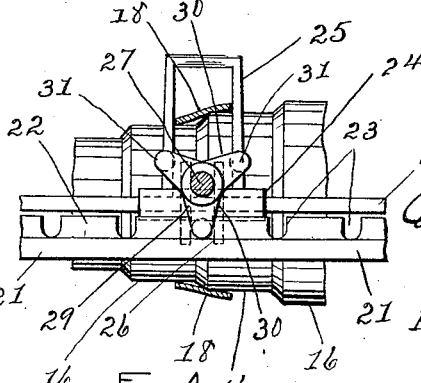

In the drawings, Figure 1 is a bottom plan view of a preferred form of my device; Figs. 2 and 3 are vertical sections on the planes 2—2, 3—3, respectively, Fig. 1; Fig. 4 shows a detail.

11 is a drive, and 12, a driven shaft, both supported by hangers 13. Each shaft carries a similar but oppositely placed cone 14, 15, composed, as shown, of a series of cylindric steps 16 separated by short conical or beveled portions 17, and connected by a belt 18. From the proximate sides of each pair of hangers 13 projects a bracket 19, each pair of which supports a squared shaft 20 and a second bar or shaft 21, shown as having an upwardly projecting rib 22, in which is milled a series of notches 23, see Fig. 2. On each shaft 20 is mounted a journal box 24, free as to longitudinal movement on the shaft and carrying a belt engaging fork 25. In each box 24 is cut a groove or recess 26, which together support a rotary and vertically movable shaft 27, carrying a pulley 28. At each end of shaft 27, is also secured a spider 29, shown as having three arms 30, at the end of each of which is a laterally projecting pin 31. As clearly shown in Figs. 2 and 3, the notches 23 on shafts 21 are spaced apart, and each shaft is so located, that two of the pins 31 on each spider 29 engage in adjacent notches 23 when shaft 27 is in its lowermost position in boxes 24. To the periphery of pulley 28 are secured the ends of a cord or chain 32, which cord passes several times around the pulley and thence through guide pulleys 33 supported on straps 34 at the ends of shaft 20 and thence through other suitably located pulleys 35, the bight 36 of the cord hanging within easy reach of the operator of the lathe or other machine.

It is obvious that my invention is not limited to the form, proportions or arrangement of the parts shown, as many mechanical alterations may be made in these and other respects without departing from my invention, such as, *e. g.*, the omission of certain duplicated parts.

The operation of the device in the form here shown will be readily understood from an examination of the drawings.

As shown in Figs. 1 and 2 of the drawings, the belt 18 will run at its second highest speed. A pull of cord 32 at the right of the figures will act through pulley 28 to rotate shaft 27 clockwise, raising the shaft bodily in grooves 26 by means of arms 30, see Fig. 4, as it moves to the right and again lowering it as the formerly disengaged pin 31 drops into notch 23 at the right of those previously occupied. Obviously, this transverse movement of shaft 27, which carries forks 25, operates to shift belt 18 over one of the conical portions 17 on to the adjacent step 16, see Fig. 4, thus reducing the speed of driven shaft 12. It is also obvious that succeeding pulls of cord 32 will operate to shift belt 18 step-by-step in either direction as desired, and that the transverse movement of the belt is positive by reason of the two forks 25, and particularly by reason of the duplication of parts 21 and 29, which is the preferred form of construction.

The advantage of constructing and arranging the parts so that shaft 27 is raised and lowered during its transverse movement lies in its appeal both to the ear and the muscular sense of the operator, beside forming an efficient lock against accidental shifting of the belt.

I do not wish to be limited as to the scope of my invention except by the appended claims.

What I claim is:

1. A belt shifting device including a rotary shaft extending transversely of the belt carrying shaft; manual means for moving said first-named shaft horizontally transversely of its length and simultaneously in a vertical direction; and means operated by the weight of said shaft for automatically locking said shaft in desired position.

2. A belt shifting device including a shaft parallel with the belt carrying shaft; a grooved journal movable horizontally longitudinally on said first-named shaft; a shaft mounted for limited vertical movement in said journal and extending transversely of said first-named shaft; belt engaging means on said transverse shaft; and means for moving said transverse shaft and said journal on said first-named shaft, said means being operative to rotate said shaft and to simultaneously move it in a vertical direction, whereby the weight of said shaft acts to lock it against accidental rotation.

3. A belt shifting device including a rotary shaft extending transversely and horizontally movable longitudinally of the belt carrying shaft; belt engaging means on said shaft; and means, operative in connection with a vertical transverse movement of the shaft, for locking it in each of a plurality of its transversely moved positions.

4. A belt shifting device including two shafts parallel with the belt carrying shaft; a journal horizontally movable longitudinally on one of said shafts; a shaft mounted for limited vertical movement in said journal and extending transversely of said shafts; belt engaging means on said transverse shaft; manual means for moving said journal and said transverse shaft to shift the belt; and coöperating gravity-operated locking means on said transverse shaft and the other of said parallel shafts.

5. A belt shifting device including two stationary shafts parallel with the belt carrying shaft; a grooved journal horizontally movable longitudinally on one of said shafts, the other of said shafts being formed with a series of vertical grooves; a rotary shaft mounted for limited vertical movement in said journal and having at its end a spider carrying a plurality of pins parallel with the shaft; and engageable with the grooves of said series; belt engaging means on said rotary shaft; manual means for rotating said shaft, whereby, through the coöperation of said pins and said grooves, it simultaneously receives transverse horizontal and vertical movement, whereby the weight of said shaft acts to lock it against accidental rotation.

CHARLES H. MATTICE.

Witnesses:
GEO. L. COOPER,
AMOS B. DUBY.

Copies of this patent may be obtained for five cents each, by addressing the "Commissioner of Patents, Washington, D. C."